United States Patent Office 2,784,222
Patented Mar. 5, 1957

2,784,222
PURIFICATION OF TRIIODOTHYRONINE

John Thomas Plati, Rutherford, and Wilhelm Wenner, Upper Montclair, N. J., assignors to Hoffmann-La Roche Inc., Nutley, N. J., a corporation of New Jersey No Drawing. Application March 10, 1954,
Serial No. 415,440

10 Claims. (Cl. 260—519)

This invention relates to a method for the purification of 3,5,3'-triiodothyronine.

3,5,3'-triiodothyronine, hereinafter referred to as triiodothyronine, is a substance which occurs, together with thyroxine, in the thyroid gland. These are known substances with thyroid activity. Previous efforts to obtain triiodothyronine have produced only very small amounts of the desired compound. When synthetic methods of preparation are employed, 10% or more of thyroxine is generally present in the product. By the process of this invention triiodothyronine free from thyroxine may now be obtained in practical quantities.

According to this invention, triiodothyronine may be purified by countercurrent solvent extraction employing a water immiscible alcohol and an alkali metal hydroxide as the solvent pair. A solution of the crude mixture comprising triiodothyronine and thyroxine is introduced at about the mid-point of a multi-stage solvent extraction system in which the water immiscible alcohol and alkali metal hydroxide are in countercurrent flow. The purified triiodothyronine is collected in the heavy solvent which has passed through the system and may be isolated as a pure compound by precipitation from the alkali metal hydroxide solution with concentrated hydrochloric acid and subsequent centrifuging.

The process is carried out by extracting in 30 to 40 stages, preferably in a continuous countercurrent solvent extraction column which consists of alternate calming and mixing sections. A column of the type preferred in this process is described in U. S. Patent No. 2,493,265, issued January 3, 1950, to Edward G. Scheibel.

The light solvent employed in this process is a water immiscible alcohol such as a butyl or amyl alcohol, preferably n-butanol. The heavy solvent is an alkali metal hydroxide solution, preferably sodium hydroxide solution. The alkali metal hydroxide is employed at a concentration of about 1.5 N to 3 N. The ratio of light solvent to heavy solvent should be maintained within a range of about 1 to 5 to 1 to 10, respectively, on a volumetric basis. Preferably the ratio is maintained at about 1 to 7. In a continuous operation, according to the preferred procedure, the desired ratio is maintained by adjusting the flow rate of the light solvent in the column at $\frac{1}{7}$ the flow rate of the heavy solvent.

According to a particularly preferred method of practicing this invention, 3,5-diiodothyronine in an aqueous solution of an alkylamine, such as methylamine, is treated with freshly prepared iodine solution at about room temperature under efficient stirring to iodinate the starting compound. In order to assure complete iodination, slightly in excess of 2 atoms of iodine per mol of diiodothyronine is employed. The resulting reaction mixture is distilled at about 60° C. or lower, filtered, and dried.

The crude reaction mixture obtained in this manner, containing predominantly triiodothyronine and about 10 to 15% thyroxine, is dissolved in dilute aqueous sodium hydroxide of about 1 to 2 N to form a concentrated solution of the iodinated product in the alkali (approximately 10 to 17%, preferably 15%, iodination product by weight). Sodium hydroxide solution and butanol are introduced into the top and bottom, respectively, of a multi-stage, liquid-liquid extraction tower of the type described above until equilibrium is established. The flow rate of the n-butanol is maintained at about $\frac{1}{7}$ the flow rate of the sodium hydroxide solution.

The solution of iodination product in dilute sodium hydroxide described above is slowly introduced at about the mid-point of the extractor. The countercurrent flow of light and heavy solvents is continued after all the feed has been introduced into the extractor until a sample of alkaline solution withdrawn from the bottom of the column shows no red color when treated with hydrochloric acid and sodium nitrite and finally with ammonium hydroxide. Since a positive test, i. e., the appearance of a red color, indicates that triiodothyronine is present, the failure of the red color to appear in the sample indicates complete extraction of triiodothyronine.

The sodium hydroxide solution obtained from the column is acidified to a pH of about 2.5 to 3 with concentrated hydrochloric acid. The flocculent precipitate which forms upon addition of the acid is the free base, 3,5,3'-triiodothyronine, which may be separated by centrifuging or the like. The free base may be converted into its hydrochloride by treatment with an excess of dilute hydrochloric acid, i. e., about 2 N HCl. The hydrochloride of triiodothyronine may also be prepared directly, without separation of the free base, by adding an excess of hydrochloric acid to the alkaline solution obtained from the column.

Example

A solution of 38.1 grams of powdered iodine and 38.1 grams of potassium iodide was prepared by shaking vigorously with sufficient water to attain a volume of 300 cc. A few particles of iodine remained undissolved. Titration of a sample of the supernatant liquid with sodium thiosulfate in the conventional manner showed that the liquid had an iodine concentration of 0.982 N.

A solution of 57.8 grams (0.11 mol) of 3,5-diiodothyronine in 500 cc. of 25% methylamine in water was next prepared and 242 cc. (0.24 atom) of the iodine solution was added at a uniform rate during 5½ hours with efficient stirring at 27° C. After stirring for an additional 40 minutes, the mixture was distilled at 35 mm. with stirring in a bath at 60° to remove the methylamine. The residue was filtered and the precipitate washed thoroughly with water. The pH of the filtrate and washings was 8.4. After drying in a desiccator over potassium hydroxide, the crude iodinated mixture containing predominantly 3,5,3'-triiodothyronine melted at 198–199° C. An estimate by paper chromatography indicated that the crude mixture contained 10–15% thyroxine.

n-Butanol and 2 N sodium hydroxide were shaken together in order to attain an equilibrium between the two solvents. The light and heavy layers were then separated. The light (n-butanol) layer was introduced into the bottom and the heavy (sodium hydroxide) layer was introduced into the top of a countercurrent extraction column. The column, 277 cm. long and about 3 cm. in diameter, contained 34 stages, each stage having a mixing and calming portion. The calming portion of each stage comprised a roll of wire mesh packing. Paddle type agitators mounted on a rotatable central shaft extended into each of the mixing sections. The flow rate of the light solvent was maintained at approximately $\frac{1}{7}$ the flow rate of the heavy solvent. When equilibrium was attained, 20 grams of the crude iodinated mixture obtained above dissolved in 120 cc. of 1 N sodium hydroxide was admitted into the middle of the column in four portions during about one hour. The countercurrent flow of the light and heavy solvents was continued at the same relative rate until 8070 cc. of the heavy, aqueous solvent and 1200 cc. of the light, butanolic solvent were collected. The end of the extraction was noted when a sample of alkaline solution gave no red color upon treatment for a short time with hydrochloric acid and sodium nitrite and finally with ammonium hydroxide.

The sodium hydroxide solution which was collected was acidified with about 1200 cc. of concentrated hydrochloric acid. The temperature rose to 50° and 3,5,3'-triiodothyronine precipitated as a flocculent mass. The pH of the filtrate was 2.82. This precipitate was separated by centrifuging in 6 portions in 250 cc. bottles.

To convert the base into its hydrochloride, the contents of each bottle were treated separately by introducing into 1300 cc. of boiling 2 N hydrochloric acid. A small amount of insoluble material remained. It was removed by adding 0.5 gram of activated charcoal together with diatomaceous earth and filtering the hot mixture by gravity through a heated funnel. The filtrate was then cooled to 55° with stirring, seeded and allowed to stand overnight undisturbed. The six individual filtrates yielded well-formed crystals of 3,5,3'-triiodothyronine hydrochloride, M. P. 200–202° C., with dec. (uncorr.). A second crop of crystals was obtained when the acid filtrates were made basic with 50% alkali to pH 5.1 and the resulting precipitate was separated and crystallized from 2 N hydrochloric acid. The compound is hygroscopic. No evidence of either diiodothyronine or thyroxine was revealed by paper chromatography.

3,5-diiodothyronine, 3,5,3'-triiodothyronine and thyroxine occur in the form of levo- and dextro-stereoisomers and in racemic mixtures. The references in the disclosure and the claims to these compounds are applicable to all three forms in which each compound occurs.

We claim:

1. A process for the purification of 3,5,3'-triiodothyronine which comprises solvent extracting a solution comprising 3,5,3'-triiodothyronine with a water immiscible alcohol and an alkali metal hydroxide in countercurrent flow, collecting the heavy solvent and separating 3,5,3'-triiodothyronine therefrom.

2. A process according to claim 1 wherein the water immiscible alcohol is n-butanol and the alkali metal hydroxide is sodium hydroxide.

3. A process for purification of 3,5,3'-triiodothyronine which comprises introducing a solution comprising 3,5,3'-triiodothyronine into a multi-stage solvent extractor wherein a water immiscible alcohol and an alkali metal hydroxide are in countercurrent flow, contacting the 3,5,3'-triiodothyronine solution with the solvents, withdrawing the alkali metal hydroxide solvent from the extractor and separating substantially pure 3,5,3'-triiodothyronine therefrom.

4. A process according to claim 3 wherein the water immiscible alcohol is n-butanol and the alkali metal hydroxide is sodium hydroxide.

5. A process according to claim 3 wherein the 3,5,3'-triiodothyronine is separated from the alkali metal hydroxide solvent by precipitation with concentrated hydrochloric acid.

6. A process according to claim 3 wherein the alkali metal hydroxide is at a concentration of about 1.5 N to 3 N and the ratio of light solvent to heavy solvent is maintained within the range of about 1 to 5 to 1 to 10.

7. A process for the purification of 3,5,3'-triiodothyronine free from thyroxine which comprises dissolving a crude mixture containing 3,5,3'-triiodothyronine in a dilute alkali metal hydroxide solution, introducing the alkali metal hydroxide solution of 3,5,3'-triiodothyronine at about the mid-point of a multi-stage solvent extraction column wherein a light solvent comprising n-butanol and a heavy solvent comprising dilute sodium hydroxide are in countercurrent flow, continuously contacting the feed mixture with the countercurrently flowing solvents, continuously withdrawing and collecting sodium hydroxide solution from the extractor, and precipitating substantially pure 3,5,3'-triiodothyronine from the sodium hydroxide solution.

8. A process according to claim 7 wherein the 3,5,3'-triiodothyronine is converted to its hydrochloride salt by separating the 3,5,3'-triiodothyronine from the sodium hydroxide solution and treating the 3,5,3'-triiodothyronine with an excess of dilute hydrochloric acid.

9. A process according to claim 7 wherein the light and heavy solvents are in a ratio of 1 to 7, respectively.

10. A process according to claim 9 wherein the alkali metal hydroxide solvent for the crude mixture is 1 to 2 N sodium hydroxide and the heavy extracting solvent is about 2 N sodium hydroxide.

References Cited in the file of this patent

Gross et al.: Biochem. Journal, vol 53, pp. 645–50 (1953).